Sept. 20, 1938. V. SWEET 2,130,933
CAP AND SCARF ASSEMBLY
Filed Sept. 2, 1937 4 Sheets-Sheet 1

INVENTOR.
Vance Sweet
BY Woodling and Krost
ATTORNEY.

Sept. 20, 1938.     V. SWEET     2,130,933
CAP AND SCARF ASSEMBLY
Filed Sept. 2, 1937     4 Sheets-Sheet 2
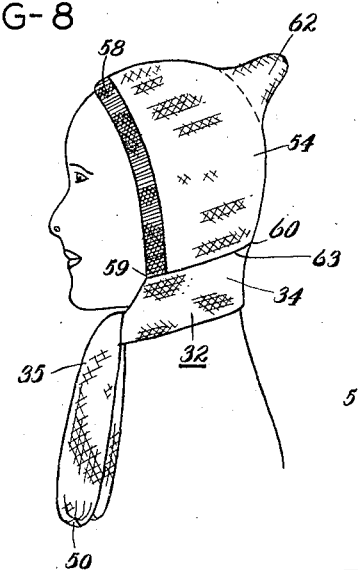
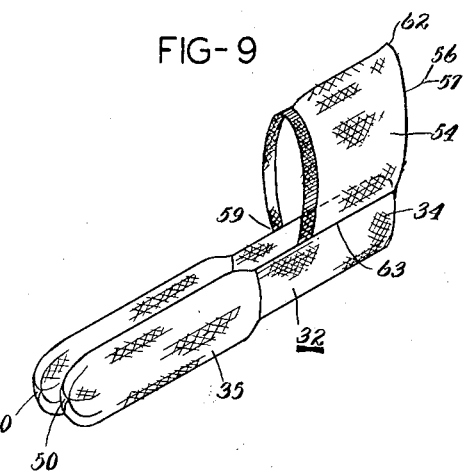
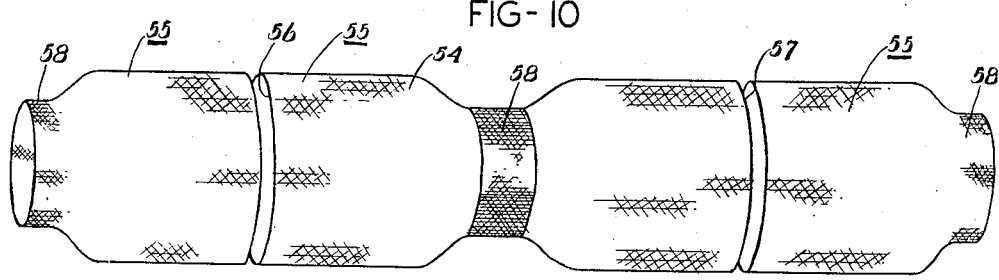
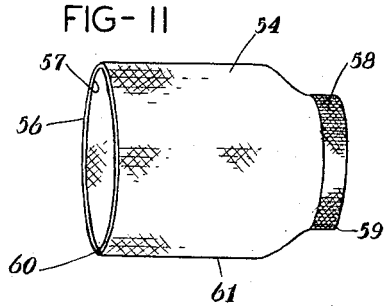
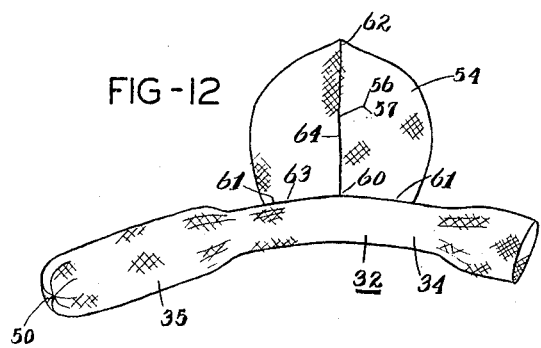
INVENTOR.
Vance Sweet
BY Woodling and Krost.
ATTORNEY.

Sept. 20, 1938.   V. SWEET   2,130,933
CAP AND SCARF ASSEMBLY
Filed Sept. 2, 1937    4 Sheets-Sheet 3

INVENTOR.
Vance Sweet
BY Woodling and Krost.
ATTORNEY.

Sept. 20, 1938.    V. SWEET    2,130,933
CAP AND SCARF ASSEMBLY
Filed Sept. 2, 1937    4 Sheets-Sheet 4
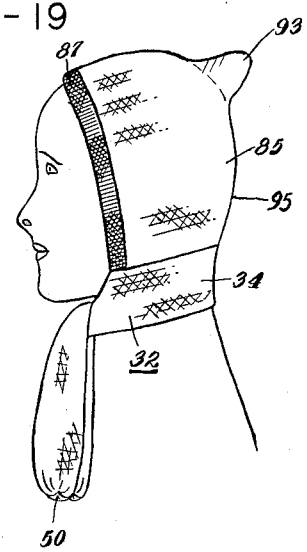
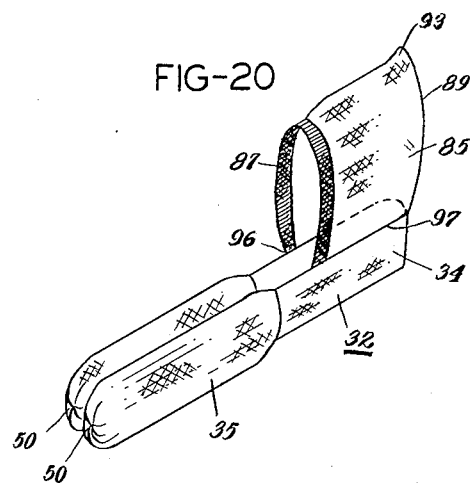
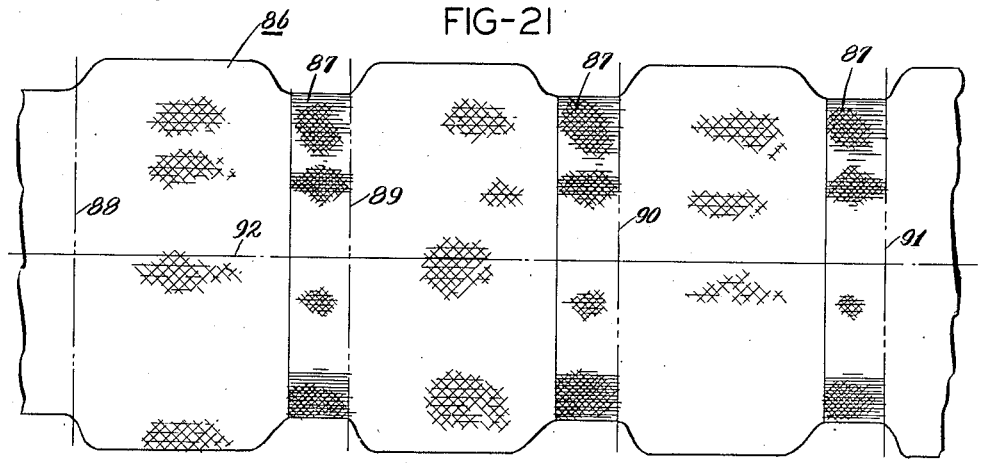
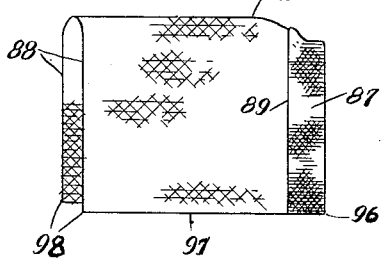
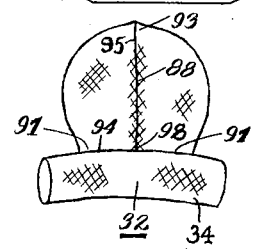
INVENTOR.
Vance Sweet
BY Stoodling and Krost.
ATTORNEY.

Patented Sept. 20, 1938

2,130,933

UNITED STATES PATENT OFFICE 2,130,933

CAP AND SCARF ASSEMBLY

Vance Sweet, Cleveland, Ohio, assignor to Harold V. Ensten

Application September 2, 1937, Serial No. 162,225

10 Claims. (Cl. 2—203)

My invention relates in general to knitted garments and more particularly to a knitted cap and scarf assembly and the method for making the same.

An object of my invention is the provision of a double-walled cap and scarf assembly.

Another object of my invention is the provision of a knitted cap and scarf assembly having the stitch ribs of the cap portion running substantially horizontally to give vertical elasticity for making a good fit for the head.

A further object of my invention is the provision of a knitted cap and scarf assembly having a cuff stitch at the forward open end of the cap portion to draw the open end closely against the head.

A further object of my invention is the provision of making a knitted cap and scarf assembly from two knitted tubes.

A further object of my invention is the provision of making a knitted cap and scarf assembly from two flat pieces of material.

Another object of my invention is the provision of making a knitted cap and scarf assembly in which the cap portion of the assembly is made from a knitted tube having cuff stitches at spaced intervals and with the stitch ribs running longitudinally of the tube.

Another object of my invention is the provision of making a knitted cap and scarf assembly in which the cap portion of the assembly is made from a knitted flat piece of material having cuff stitches at spaced intervals and with the stitch ribs running longitudinally of the flat piece of material.

Another object of my invention is the provision of making a knitted cap and scarf assembly in which the cap portion is made from a flat piece with longitudinal stitched ribs and with cuff stitches at spaced intervals.

Another object of my invention is the provision of a knitted cap and scarf assembly which is elastic for making a good fit for the head.

Another object of my invention is the provision of a knitted cap and scarf assembly having a part of the cap portion turned back at its open end to make a cuff.

Another object of my invention is the provision of making a knitted cap and scarf assembly in which the cap portion is made by folding a knitted tube within itself for substantially one-half its length to make a tubular double-walled knitted cap portion.

Other objects and a fuller understanding of my invention may be had by referring to the following description and claims taken in combination with the accompanying drawings in which like parts are designated by like reference characters and in which;

Figure 8 shows a side elevational view of a modified form of my knitted cap and scarf assembly as it appears upon a person;

Figure 9 shows a side elevational view of my knitted cap and scarf assembly as illustrated in Figure 8;

Figure 10 shows a continuously knitted tube which may be severed for making the cap portion as illustrated in Figures 8 and 9;

Figure 11 shows a side view of the severed tube shown in Figure 10 and folded within itself for substantially one-half its length to make a tubular double-walled knitted cap portion;

Figure 12 illustrates a rear view of the knitted cap and scarf assembly shown in Figures 8 and 9;

Figure 19 shows a side elevational view of another arrangement of my knitted cap and scarf assembly as it appears upon a person;

Figure 20 is a side elevational view of my knitted cap and scarf assembly as shown in Figure 19;

Figure 21 is a continuously knitted flat piece which may be severed for making the cap portion shown in Figures 19 and 20;

Figure 22 is a side elevational view of a severed piece from the continuous flat piece of Figure 21 and folded to make the cap portion as shown in Figures 19 and 20; and Figure 23 is a rear view of my knitted cap and scarf assembly as shown in Figures 19 and 20.

Figure 1:
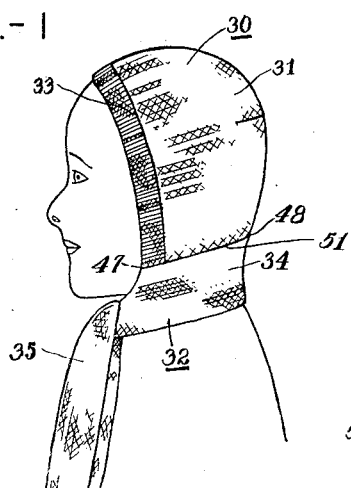
Figure 1 is a side elevational view of my knitted cap and scarf assembly as it appears upon a person.
Figure 2:
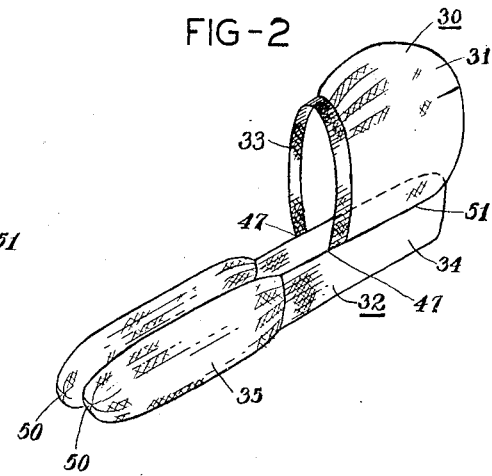
Figure 2 illustrates a side elevational view of my knitted cap and scarf assembly.

With reference to Figures 1 and 2 of the drawings, my knitted cap and scarf assembly is indicated generally by the reference character 30, and comprises a cap portion 31 and a scarf portion 32. The scarf portion has a neck portion 34 and a scarf part 35 and as illustrated the scarf part 35 may be somewhat enlarged in order to cover the chest when tied at the neck as illustrated in Figure 1. The scarf portion 32 may be made from a continuously knitted tube and severed at suitable lengths to make a neck part 34 and the two scarf parts 35. In knitting the tubular scarf portion 32, the neck part 34 may be made with a cuff stitch different from that employed to make the scarf part 35. In other words, the continuous tube from which the scarf portion 32 is severed, is alternately knitted with a reduced portion 34 and with an enlarged portion 35. The severed end of the tubular scarf portion 32 may be suitably tied to make a good appearing end as illustrated by the reference character 50. While I have shown a tubular scarf portion 32 with the neck part 34 knitted with a different stitch from that of the scarf part 35, it is to be clearly understood that the scarf portion 32 may be of any suitable shape, where the neck part 34 and the scarf part 35 are substantially the same width, or the scarf portion 32 may be made of any other suitable knitted piece which may or may not be of a tubular construction.

Figure 3:
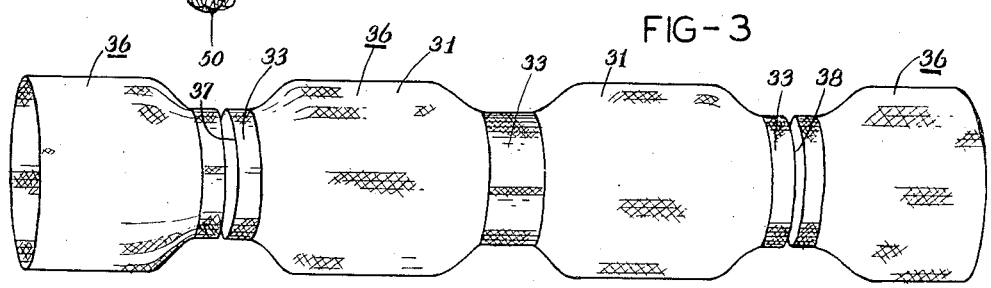
Figure 3 illustrates a continuously knitted tube which may be severed in suitable lengths for making the cap portion of my garment.
Figure 4:
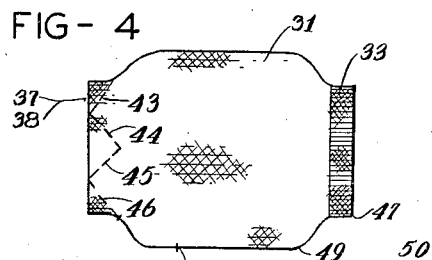
Figure 4 shows a side elevational view of the severed portion of the continuous tube in Figure 3 and folded within itself for substantially one-half its length to make a tubular double-walled knitted cap portion.
Figure 7:
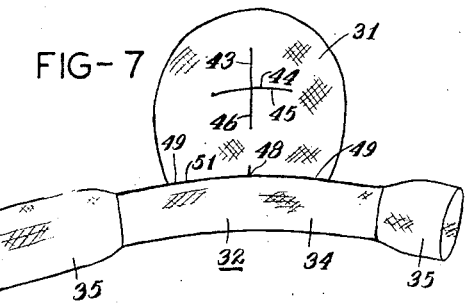
Figure 7 shows a rear assembly view of my knitted cap and garment assembly.

The cap portion 31 is made from the continuously knitted tube 36 as shown in Figure 3. The continuously knitted tube 36 may be automatically knitted with cuff stitches 33 at spaced intervals; that is to say, the stitches for making the reduced portion 33 are knitted with a cuff stitch which is different from the stitches for making the enlarged cap part 31. The stitch ribs of the continuously knitted tube 36 run longitudinally of the tube and as illustrated, the stitch ribs throughout the reduced portion 33 are more elastic and more closely knitted than the stitch ribs for the cap portion 31. In Figure 3, the continuously knitted tube may be severed as at 37 and 38. The length of the severed tube is such as to make it substantially twice as long as the cap portion and it is folded within itself for substantially one-half its length to make a tubular double-walled knitted cap portion as shown in Figure 4. When folded within itself, the severed tube in Figure 3 is such that the severed end 38 coincides substantially with the severed end 37 and the cuff stitch portion 33 is folded upon itself to make a double-walled cuff stitch portion 33 to draw the open end of the cap portion closely against the head.

Figure 5:
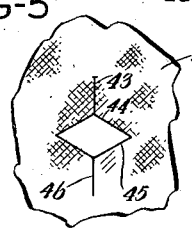
Figure 5 shows a fragmentary view of the left-hand end of the tubular double-walled knitted cap portion of Figure 4 and illustrates the manner of closing the left-hand end of the tubular double-walled knitted cap portion.
Figure 6:
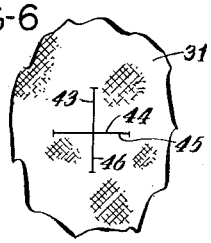
Figure 6 is a fragmentary view similar to Figure 5 and shows a final operation for closing the left-hand end of the tubular double-walled knitted cap portion in Figure 4.
Figure 13:
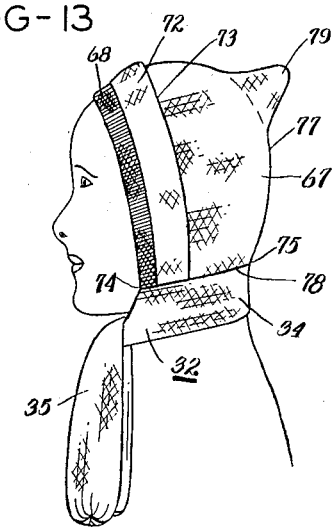
Figure 13 shows another arrangement of my knitted cap and scarf assembly as it appears upon a person.
Figure 14:
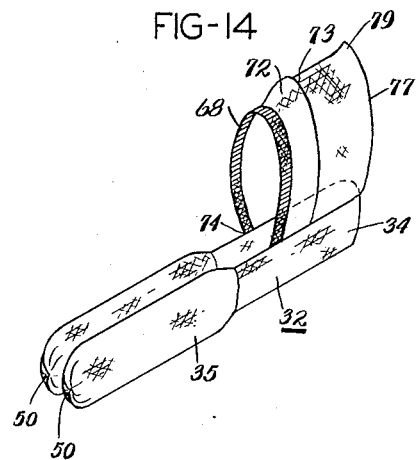
Figure 14 shows a side elevational view of my knitted cap and scarf assembly.

After the severed tube 31 is folded within itself for substantially one-half its length as shown in Figure 4, the left hand end is cut along the lines 43, 44, 45 and 46. After the left hand end of the tubular double-walled knitted cap portion 31 in Figure 4 is cut, the next step is to sew or otherwise close the tubular double-walled knitted cap portion for fitting the back of the head. The manner of sewing or otherwise closing the left-hand end or the rear of the cap portion is illustrated in Figures 5 and 6. In the sewing or other fastening operation, the cut edges 43 and 46 are first closed as shown in Figure 5. Then the cut edges 44 and 45 are drawn together and sewed or otherwise fastened as shown in Figure 6. The method of sewing or fastening the cut edges 43, 44, 45 and 46 together may be done with a suitable machine as that now employed in sewing or otherwise fastening knitted garments together. The cuff stitch at the left-hand end of the tubular double-walled knitted cap portion in Figure 4, gives a great deal of elasticity so that the closed end of the cap portion fits well upon the back of the head of the person.

After the left-hand end of the tubular double-walled knitted cap portion is closed, it is then cut longitudinally from the point 47 to the point 48 which makes cut edges 49. After this, the cut edges 49 are sewed or otherwise suitably fastened to the top edge of the neck part 34, making a seam indicated by the reference character 51. The sewing or other fastening operation may be done with any suitable machine as that now employed for fastening knitted garments together. This completes the construction of my knitted cap and scarf assembly and it is observed that the stitch ribs of the cap portion run substantially horizontally to give vertical elasticity for making a good fit for the head. Therefore, when a person puts on my knitted cap and scarf assembly, it may be stretched vertically upon the head and adjusted to give a smooth fit. In addition, the cuff edge 33 draws the open end closely against the head to give not only a good appearance but also added warmth.

In Figures 8 to 12 inclusive, I show another arrangement of my knitted cap and scarf assembly. In this assembly the construction of the scarf portion is the same as that shown and described with reference to Figures 1 to 7 inclusive, and corresponding parts are identified by like reference characters. The cap portion however is changed and is indicated by the reference character 54 which is made by severing a piece from the continuously knitted tube 55 shown in Figure 10. The continuously knitted tube 55 in Figure 10 may be severed at 56 and 57, with the cuff stitch portion 58 substantially midway between the two severed ends. The severed tube is then folded within itself for substantially one-half its length to make the tubular double-walled knitted cap portion 54 in Figure 11. In other words, when the severed tube 54 in Figure 10 is folded within itself for substantially one-half its length, the severed edge 57 coincides substantially with the severed edge 56. This means that the cuff stitch portion 58 is folded upon itself giving a double-walled cuff stitch portion for drawing the open end of the cap portion closely against the head. The tubular double-walled knitted cap portion 54 in Figure 11 is then cut longitudinally beginning at the point 59 and continuing its full length to the point 60, making the cut edges 61. The tubular double-walled knitted cap portion 54 in Figure 11 is then flattened and the coinciding severed edges 56 and 57 are sewed or otherwise fastened making a seam 64 for closing the cap portion upon the rear of the head. The cut edges 61 are then sewed or otherwise fastened to the top edge of the scarf part 34 making a seam 63. When the knitted cap and scarf assembly as shown in Figures 8 to 12 inclusive is mounted upon the head, the rear portion of the cap makes a peak 62 as shown in Figure 8. In this embodiment of my invention the stitch ribs of the cap portion run substantially horizontally to give vertical elasticity so that the cap portion 54 may be smoothly and nicely fitted about the head. Also the cuff stitch 58 at the open end of the cap portion 54 draws the open end closely against the head to give not only good appearance but also added warmth.

Figure 15:
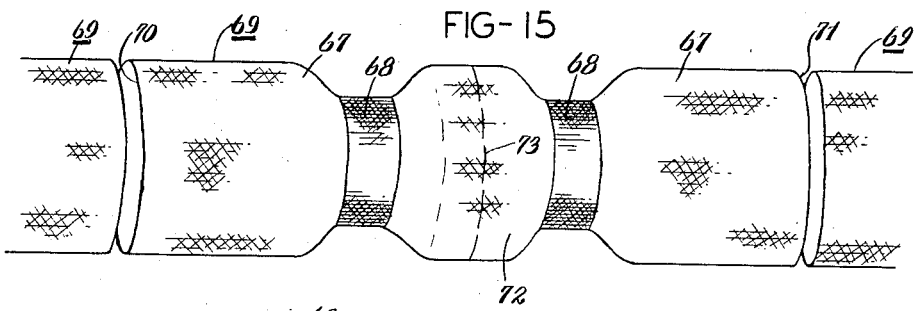
Figure 15 shows a continuous tube which may be severed for making the cap portion shown in Figures 13 and 14.
Figure 16:
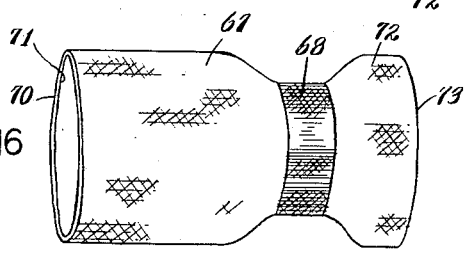
Figure 16 shows a side elevational view of the severed tube in Figure 15 as folded within itself for substantially one-half its length to make a tubular double-walled knitted cap portion.
Figure 18:
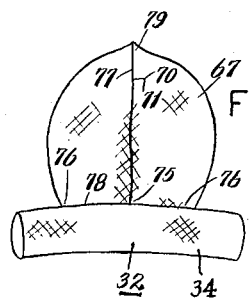
Figure 18 is a rear view of my knitted cap and scarf assembly as shown in Figures 13 and 14.
Figure 17:
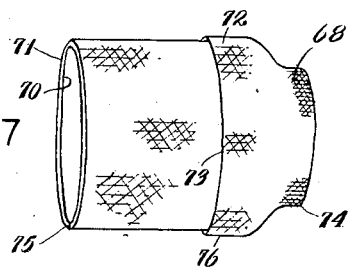
Figure 17 is a view similar to Figure 16 with the right-hand end of the tubular double-walled knitted cap portion turned back at its open end to make a cuff.

In Figures 13 to 18 inclusive I show another arrangement of my knitted cap and scarf assembly and in this embodiment the scarf portion 32 may be the same as that previously described and like reference characters represent like parts. The cap portion 67, however, is changed over that shown in Figures 8 to 12, inclusive, in that the front part is turned back to make a cuff 72. The cap portion 67 is made by severing a tube from a continuously knitted tube 69 as shown in Figure 15. The severed tube in Figure 15 is folded within itself for substantially one-half its length to make a tubular double-walled knitted cap portion 67 as shown in Figure 16. In its folded position, the two spaced cuff stitch portions 68 coincide with each other and the severed end 71 coincides with the severed end 70. A forward or folding edge is indicated by the line 73. After the severed tube in Figure 15 is folded upon itself as shown in Figure 16, the cuff 72 is folded back as indicated in Figure 17, causing the cuff stitch portion 68 to appear upon the forward end or the open end of the cap portion 67. The double-walled knitted cap portion in Figure 17 is then cut longitudinally for its full length, beginning at the point 74 and continuing to the point 75 making the cut edges 76. The coinciding severed edges 70 and 71 are then sewed or otherwise fastened for making a seam 77 for closing the rear of the cap portion. The cut edges 76 are sewed or otherwise fastened to the upper edge of the neck part 34 of the scarf portion 32, making a seam 78. When the cap and scarf assembly as shown in Figures 13 to 18 inclusive is mounted upon the head, a peak 79 is made to give a good appearance. The embodiment shown in Figures 13 to 18 inclusive is substantially the same as that shown in Figures 8 to 12 inclusive, but has an added feature of the cuff 72 which adds to the appearance as well as giving additional warmth and comfort.

In Figures 19 to 23, I show another arrangement of my knitted cap and scarf assembly and in this embodiment the scarf portion 32 is the same as that previously described with reference to the other showings of my invention. The knitted cap portion 85 is made from a continuously knitted flat strip 86 as shown in Figure 21. The continuous strip 86 in Figure 21 is flat and not tubular and has at spaced intervals cuff stitches 87 with the stitch ribs running longitudinally of the piece. In knitting the continuous strip 86 in Figure 21, the thread stitches 88, 89, 90, and 91 are run transversely of the strip so that it may be severed along these lines and still leave a selvaged edge to keep the cuff stitch portion 87 from unravelling. The severed portion upon the left-hand end of the continuous strip in Figure 21 is used to make the cap portion shown in Figure 22 and is folded upon itself along the longitudinal center line 92. The two coinciding edges 88 are sewed or otherwise suitably fastened together making a seam 95. The bottom edges 97 which extend from the point 96 to the point 98 are sewed or otherwise fastened to the neck part 34 of the scarf portion 32 making a seam 94. In the embodiment of my invention shown in Figures 19 to 23, inclusive, the cap portion is knitted so that the stitch ribs run substantially horizontally to give vertical elasticity so that when the cap and scarf assembly is mounted upon the head, it may be stretched to give a smooth and comfortable fit. Also the cuff stitch portion 87 is arranged to draw tightly against the head to give a good appearance as well as added warmth. When the garment is mounted upon the head, a peak 93 appears as shown in Figure 19. While I have shown a tubular scarf construction for each of the forms of my invention, it is to be understood however, that the scarf portion may be made of a flat piece of material as well as of a tube as that illustrated. In addition, the cap portion may be made with a double-walled tubular knitted portion fastened to a tubular scarf; with a double-walled tubular knitted cap portion fastened to a flat piece of scarf material; or with a flat piece of knitted cap material fastened to a flat piece of scarf material; or with a flat piece of knitted cap material fastened to a tubular scarf. Throughout each form of my invention the stitch ribs of the cap portion run substantially horizontally to give vertical elasticity so that the cap portion may be arranged nicely upon the head, and in addition the cuff stitch portion at the open end of the cap portion is arranged to draw the cap portion tightly against the head to give a good appearance as well as added warmth.

The rear of the cap portion in Figs. 1 and 2 is shown and described as being round and fitting the head smoothly and the corresponding views of the other assemblies are shown and described as presenting peaks 62, 79 and 93, but it is to be understood that the cap portion in Figs. 2 and 3 may be made with a peak and that the corresponding views of the other assemblies may be made with a round rear part as shown and described with reference to Figs. 1 and 2.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. The method of making a double-walled cap and scarf assembly which comprises continuously knitting a scarf tube and severing said tube of such length as to make a neck part and a scarf part, flattening said scarf tube to make a double-walled thickness, continuously knitting a cap tube, severing said tube of such length as to make it substantially twice as long as the cap portion, folding the severed cap tube within itself for substantially one-half its length to make a tubular double-walled knitted cap portion, closing one end of the folded double-walled knitted cap tube, cutting the folded double-walled knitted cap tube longitudinally of its length, and fastening the cut longitudinal edges to the neck part of the scarf tube with the scarf part extending forwardly of the cap portion.

2. The method of making a double-walled cap and scarf assembly which comprises continuously knitting a scarf tube and severing said tube of such length as to make a neck part and a scarf part, flattening said scarf tube to make a double-walled thickness, continuously knitting a cap tube with cuff stitches at spaced intervals, severing said tube of such length as to make it substantially twice as long as the cap portion and with the cuff stitches substantially intermediate its ends, folding the severed cap tube within itself for substantially one-half its length to make a tubular double-walled knitted cap portion with cuff stitches at one end, closing the other end of the folded double-walled knitted cap tube, cutting the folded double-walled knitted cap tube longitudinally of its length, and fastening the cut longitudinal edges to the neck part of the scarf tube with the scarf part extending forwardly of the cap portion.

3. The method of making a double-walled cap and scarf assembly which comprises continuously knitting a scarf tube and severing said tube of such length as to make a neck part and a scarf part, flattening said scarf tube to make a double-walled thickness, continuously knitting a cap tube with cuff stitches at spaced intervals and with the stitch ribs running longitudinally of the tube, severing said tube of such length as to make it substantially twice as long as the cap portion and with the cuff stitches substantially intermediate its ends, folding the severed cap tube within itself for substantially one-half its length to make a tubular double-walled knitted cap portion, with cuff stitches at one end, closing the other end of the folded double-walled knitted cap tube, cutting the folded double-walled knitted cap tube longitudinally of its length, and fastening the cut longitudinal edges to the neck part of the scarf tube with the scarf part extending forwardly of the cap portion, and with the longitudinal stitch ribs of the cap portion running substantially horizontally to give vertical elasticity for making a good fit for the head.

4. The method of making a cap and scarf assembly which comprises continuously knitting a scarf piece and severing said piece of such length as to make a neck part and a scarf part, continuously knitting a flat cap piece with longitudinal stitch ribs and with cuff stitches at spaced distances substantially equal to the length of the cap portion of the garment, severing said flat cap piece at substantially right angles to the longitudinal stitch ribs and adjacent the cuff stitches to make the cuff stitches at one end, folding upon itself the severed flat cap piece substantially along its longitudinal center line to make a knitted cap portion with the stitch ribs running substantially perpendicular to the severed edges, closing one end of the folded flat cap piece and leaving the cuff stitched end open, fastening the lower edges of the folded flat cap piece to the neck part of the scarf piece with the scarf part extending forwardly of the cap portion and with the longitudinal stitch ribs of the cap portion running substantially horizontally to give vertical elasticity for making a good fit for the head.

5. The method of making a cap and scarf assembly which comprises continuously knitting a scarf piece and severing said piece of such length as to make a neck part and a scarf part, continuously knitting a flat cap piece with longitudinal stitch ribs, severing a cap portion from said flat cap piece with the stitch ribs running substantially perpendicular to the forward edge thereof, folding the severed cap portion upon itself to make a double wall thickness with the stitch ribs running substantially parallel to the folded edge, closing the rearward edge of the folded cap portion and leaving the forward edge open, fastening the lower edges of the folded cap portion to the neck part of the scarf piece with the scarf part extending forwardly of the cap portion and with the longitudinal stitch ribs of the cap portion running substantially horizontally to give vertical elasticity for making a good fit.

6. The method of making a cap and scarf assembly which comprises continuously knitting a scarf piece and severing said piece of such length as to make a neck part and a scarf part, continuously knitting a flat cap piece with longitudinal stitch ribs and with cuff stitches spaced at distances substantially equal to the length of the cap portion of the garment, forming the cap portion with cuff stitches along the forward edge and with the stitch ribs running substantially perpendicular to the forward edge by severing the flat cap piece adjacent the forward edge of the cuff stitches, folding the severed cap portion upon itself to make a double wall thickness with the stitch ribs running substantially parallel to the folded edge, closing the rearward edge of the folded cap portion and leaving the cuff stitched edge open, fastening the lower edges of the folded cap portion to the neck part of the scarf piece with the scarf part extending forwardly of the cap portion and with the longitudinal stitch ribs of the cap portion running substantially horizontally to give vertical elasticity for making a good fit.

7. The method of making a cap and scarf assembly which comprises continuously knitting a scarf portion and severing said portion of such length as to make a neck part and a scarf part, continuously knitting a cap tube, severing said tube of such length as to make it substantially twice as long as the cap portion, folding the severed cap tube within itself for substantially one-half its length to make a tubular double-walled knitted cap portion, closing one end of the folded double-walled knitted cap tube, cutting the folded double-walled knitted cap tube longitudinally of its length, and fastening the cut longitudinal edges to the neck part of the scarf portion with the scarf part extending forwardly of the cap portion.

8. The method of making a cap and scarf assembly which comprises continuously knitting a scarf portion and severing said portion of such length as to make a neck part and a scarf part, continuously knitting a cap tube with cuff stitches at spaced intervals and with the stitch ribs running longitudinally of the tube, severing said tube of such length as to make it substantially twice as long as the cap portion and with the cuff stitches substantially intermediate its ends, folding the severed cap tube within itself for substantially one-half its length to make a tubular double-walled knitted cap portion with the cuff stitches at one end, closing the other end of the folded double-walled knitted cap tube, cutting the folded double-walled knitted cap tube longitudinally of its length, and fastening the cut longitudinal edges to the neck part of the scarf portion with the scarf part extending forwardly of the cap portion.

9. The method of making a cap and scarf assembly which comprises continuously knitting a scarf piece and severing said piece of such length as to make a neck part and a scarf part, continuously knitting a cap piece with longitudinal stitch ribs, severing a cap portion from said cap piece with the stitch ribs running substantially perpendicular to the forward edge thereof, folding the severed cap portion upon itself with the stitch ribs running substantially perpendicular to the forward edge, closing the rearward edge of the folded cap portion and leaving the forward edge open, fastening the lower edges of the folded cap portion to the neck part of the scarf piece with the scarf part extending forwardly of the cap portion and with the longitudinal stitch ribs of the cap portion running substantially horizontally to give vertical elasticity for making a good fit.

10. The method of making a cap and scarf assembly which comprises continuously knitting a scarf piece and severing said piece of such length as to make a neck part and a scarf part, continuously knitting a cap piece with cuff stitches at spaced intervals and with longitudinal stitch ribs, severing a cap portion from said cap piece with the stitch ribs running substantially perpendicular to the forward edge thereof, folding the severed cap portion upon itself with the stitch ribs running substantially perpendicular to the forward edge and with the cuff stitches at the forward edge, closing the rearward edge of the folded cap portion and leaving the forward cuff stitched edge open, fastening the lower edges of the folded cap portion to the neck part of the scarf piece with the scarf part extending forwardly of the cap portion and with the longitudinal stitch ribs of the cap portion running substantially horizontally to give vertical elasticity for making a good fit.

VANCE SWEET.